United States Patent [19]
Schindlegger

[11] Patent Number: 5,720,552
[45] Date of Patent: Feb. 24, 1998

[54] DRINKING GLASS WITH INTEGRATED STIRRING ASSEMBLY

[76] Inventor: Walter Schindlegger, Dorf 211, A-3353 Seitenstetten, Austria

[21] Appl. No.: 640,981

[22] PCT Filed: Dec. 15, 1994

[86] PCT No.: PCT/EP94/04168

§ 371 Date: May 9, 1996

§ 102(e) Date: May 9, 1996

[87] PCT Pub. No.: WO95/16380

PCT Pub. Date: Jun. 22, 1995

[30] Foreign Application Priority Data

Dec. 17, 1993 [DE] Germany ............... 43 43 212.3

[51] Int. Cl.[6] ............... B01F 9/10; A47J 43/27
[52] U.S. Cl. ............... 366/197; 366/251; 366/314
[58] Field of Search ............... 366/130, 197, 366/199, 205, 206, 314, 241–251; 241/282.1, 282.2

[56] References Cited

U.S. PATENT DOCUMENTS

| | | | |
|---|---|---|---|
| 1,480,914 | 1/1924 | Poplawski | 366/314 |
| 3,704,864 | 12/1972 | Lee | 366/205 |
| 4,783,173 | 11/1988 | Artin | 366/205 X |

FOREIGN PATENT DOCUMENTS

| | | |
|---|---|---|
| 0 562 310A1 | 9/1993 | European Pat. Off. . |
| 1 261 346 | 4/1961 | France . |
| 2 492 246 | 4/1982 | France . |
| 2 134 804 | 8/1984 | United Kingdom . |

*Primary Examiner*—Charles E. Cooley
*Attorney, Agent, or Firm*—Flynn, Thiel, Boutell & Tanis, P.C.

[57] ABSTRACT

A drinking glass with an integral stirring assembly. The drinking glass includes a base to which a cylindrical top is attached. A stirrer is rotatably attached to the surface of the base so as to extend into the area subtended by the top. The stirrer is actuated by a motor inside the base. A seal seated in a recess located in the top of the base provides a seal around the top of the motor.

34 Claims, 3 Drawing Sheets

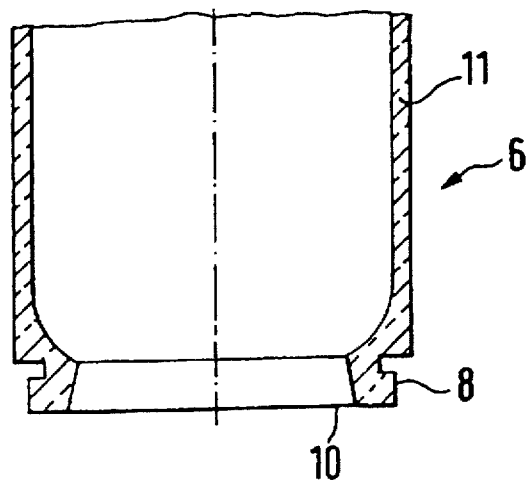
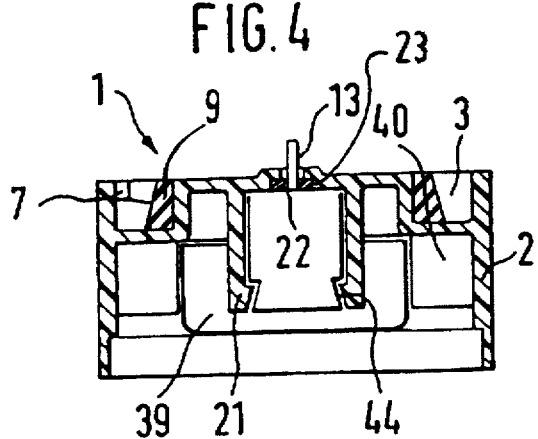
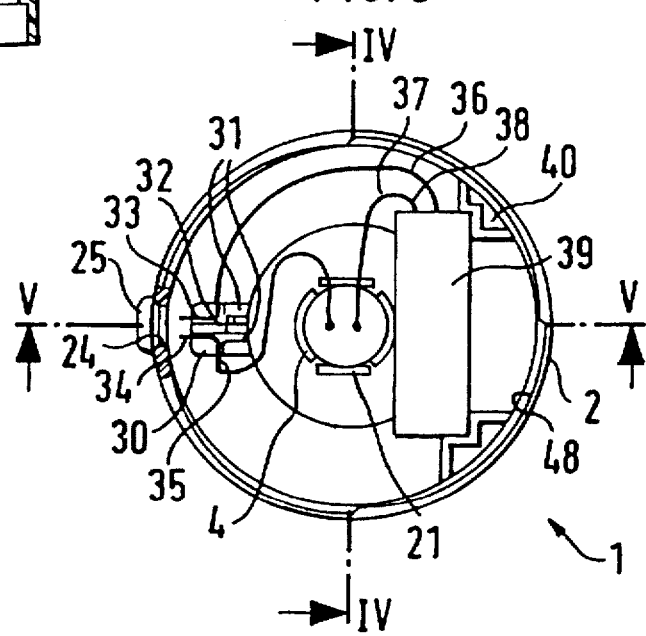

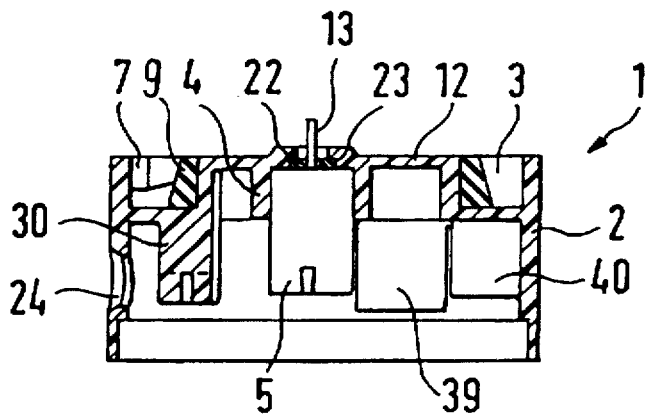
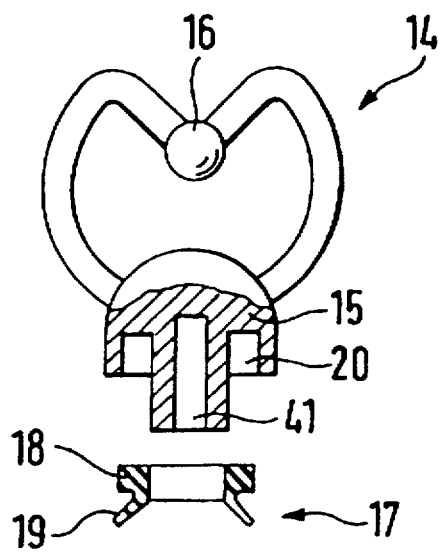
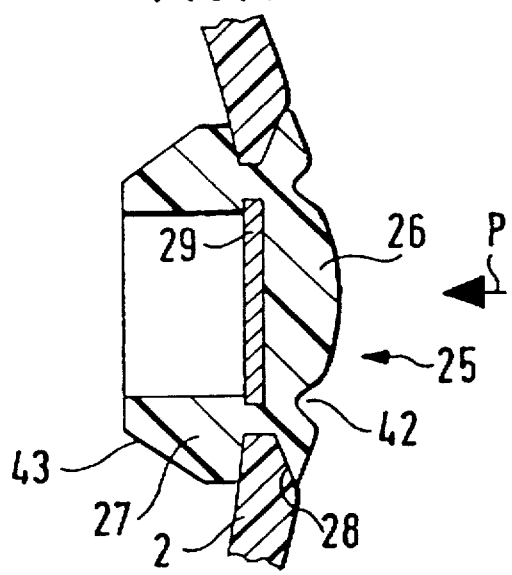

DRINKING GLASS WITH INTEGRATED STIRRING ASSEMBLY

FIELD OF THE INVENTION

The invention refers to a drinking glass having a stirrer, a base with a stirrer motor and a switch, and a detachable top mating to said base.

Such a drinking vessel is known from EP 0 562 310 A1.

SUMMARY OF THE INVENTION

The aim of the invention is simplifying the known drinking glass while improving its stirring action. The invention achieves this aim through a drinking glass provided with a base to which a top is coupled to form the drinking glass. The base is provided with a stirrer that projects into the space subtended by the top. The stirrer is actuated by a motor that is disposed within the base. A seal extends around the top of the motor to prevent liquid from leaking onto the motor.

BRIEF DESCRIPTION OF THE DRAWINGS

The following provides a detailed description of a version of the drinking glass invented with reference to the accompanying drawings. The items/views depicted in said drawings are as follows:

FIG. 2, a sectional view of the lower portion of the top;

FIG. 3, a bottom view of the base;

FIG. 4, a sectional view, sectioned along axis IV—IV of FIG. 3.

FIG. 5, a sectional view, sectioned along axis V—V of FIG. 2;

FIG. 6, a side view of the stirring tool; and

FIG. 7, a sectional view of the actuating push button of said switch, shown here greatly magnified.

DETAILED DESCRIPTION OF THE DRAWINGS

Figure 1:
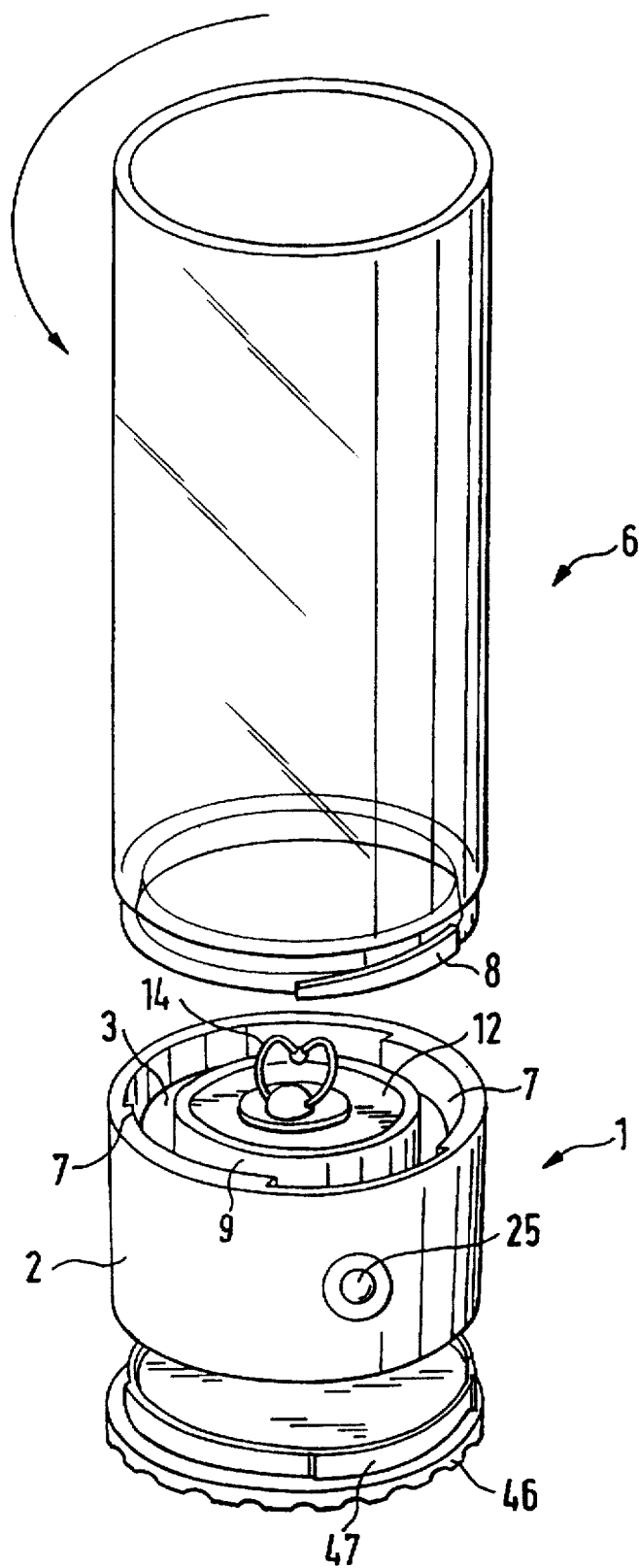
FIG. 1, an exploded view of said drinking glass.

As depicted in said drawings, said drinking glass consists of a monolithic base (1) and a cup-shaped, or cylindrical, top (6). Said base (1) is an injection-molded plastic item. Said top (6) is fabricated from glass or acrylic glass and has opposed open top and bottom ends. Said base (1) has a cylindrical lateral wall (2) and is closed off at its top by a top wall. Said top wall has an annular groove (3) running between said lateral wall (2) and its central planar section (12). The underside of said top wall has a central boss (4) for mounting the stirrer motor (5) (cf. FIG. 5). The bottom edge of said top (6) engages said annular groove (3).

In order to provide a means for attaching/detaching said top (6) to/from said base (1), the top edge of said annular groove (3) has two lugs (7) and the bottom edge of said top (6) has two identical lugs (8). Said lugs (8) may be inserted between said lugs (7) on said annular groove (3), and will pass beneath, and be clamped down by, said lugs (7) on said annular groove (3) when said top (6) is rotated with respect to said base (1).

The undersides of said lugs (7) on said annular groove (3) slope downward in the direction of rotation, and the upper surfaces of said lugs (8) on said top (6) slope upward at this same angle in the direction of rotation. The bottom edge of said top (6) will thus be forced into said annular groove (3) when said top (6) is rotated, thereby clamping it to said base.

The inner face of said annular groove (3) is provided with a tapered rubber seal (9) that progressively increases in width toward its base and abuts against a beveled mating surface (10) on said bottom edge of said top (6). When said top (6) is rotated with respect to said base, said mating surface (10) will be firmly pressed against said seal (9) and said seal (9) will be firmly pressed against said base (1). Instead of using said tapered seal (9), said planar section (12) of said base (1) may be provided with a sealing surface coated with an elastic rubber material, in which case an annular ridge on said planar section (12) mating to said sealing surface is provided on said top (6).

Said top (6) is concavely curved from the top edge of said mating surface (10) to its cylindrical lateral wall (11). The top face of said planar section (12) of said base (1) is flush with the top edge of said mating surface (10).

Rotation of the stirring tool (14) slid onto the stirrer shaft (13) generates a rapid flow along said lateral wall (11) that enhances mixing action.

Said stirrer shaft (13), which also serves as the motor shaft, may be laterally offset from the center of said annular groove (3), which will radially displace the concave surface of rotating liquid contained in said top (6) when said stirrer is rotated. This will cause any material that has been swept downward by turbulence generated by the stirring tool (14) that may be adhering to the inner surface of said lateral wall in the vicinity of the surface of the liquid to be swept away.

The stirring tool (14) depicted in FIG. 6, which consists of a heart-shaped bail whose pointed lower end is joined to a mating section (15) to form a single unit and whose cleft has a spherical protrusion (16), has proven to be particularly effective. Said protrusion (16) centers said bail (14) during rotation. Said mating section (15) has a longitudinal bore (41) that mates said stirring tool (14) to said stirrer shaft (13).

A rubber seal (17), which consists of a collar (18) plus a section (19) having a tapered wall, is provided for sealing said stirrer shaft (13). Said collar (18) is seated in an annular groove (20) on the underside of said mating section (15). Said flexible section (19) sweeps over said planar section (12) when said stirring tool (14) is rotated. Alternatively, said stirrer shaft (13) may be pitted over a seal (22) encircling said stirrer shaft (13) seated in a recess (23) in said planar section (12) (cf. FIG. 5). Seal (22) is disposed on top of motor (5).

Said central boss (4) for mounting said motor (5) consists of a ridge encircling said motor (5) (of. FIG. 3). Two opposing walls of said ridge form resilient legs (21) that retain said motor (5) and force it against the top wall of said base (1) and the seal (22) seated in recess (23). Legs (21) engage recesses (44) in said motor's housing (cf. FIG. 4).

As depicted in FIGS. 4 and 5, the seal (22) encircling said stirrer shaft (13) is seated in the annular recess (23) in the underside of the top wall of said base (1) is provided.

The actuating pushbutton (25) of said switch for activating said motor (5) is situated in a circular aperture (24) in said lateral wall (2).

As is particularly evident from FIG. 7, said pushbutton (25) is fabricated as a single unit. It is fabricated from an elastic rubber material, such as silicone rubber. Said pushbutton (25) has an actuation-indicator section (26) and an annular detenting section (27) surrounding said actuation-indicator section (26) and separated from said actuation-indicator section (26) by a groove (42) in its outer surface.

Said detenting ring (27) has a peripheral groove (28) engaged by the edge of said lateral wall (2). The inner surface (43) of said detenting ring (27) tapers inward in order to allow pressing said pushbutton (25) from outside said aperture (24).

A metal contact plate (29) is attached to the inner surface of said actuation-indicator section (26).

A protruding lug (30) is molded into the underside of the top wall of said base (1) opposite said contact plate (29). The underside of said lug (30) has two longitudinal grooves (31) extending along the direction of the arrow (P), each of which has an associated lateral groove (32) extending outward. A jumper consisting of a suitably bent length of wire (33) is inserted into each such longitudinal groove (31) and its associated lateral groove (32). That end of each such length of wire (33) protruding from its respective longitudinal groove (31) will be brought into contact with said contact plate (29) when said actuation-indicator section (26) is pressed in the direction of said arrow (P).

A rechargeable battery (39) is clamped between two notched lugs (40) molded into said lateral wall (2) and said mounting (4) for said motor (5).

The bottom of said base (1) may be closed off by a baseplate (46). As shown in FIG. 1, said baseplate (46) has beveled sealing surfaces (47) extending around its circumference mating to matching sealing surfaces (48) on the inner circumference of said base (1) (cf. FIG. 3). The drinking glass of this invention may also be configured for use as a baby bottle.

Said base (1), inclusive of said mounting (4) for said motor (5), said lug (30) for holding said jumpers (33), and said lugs (40) for mounting said rechargeable battery (39), consists of a single injection-molded plastic component.

The outer diameters of said cylindrical base (1) and said top (6) are identically dimensioned.

A nonrechargeable battery may be employed instead of said rechargeable battery (39). For example, two 1.5-V batteries, one extending along each side of said motor (5), both of them oriented parallel to the direction of actuation (P) of the switch (25), may be employed. Each such battery is equipped with contact lugs that overlap one another and are brought into contact with one another when said switch is actuated. Said switch is designed such that it both eliminates need for said contact plates (29) and forces said annular detenting section (27) against said contact lugs.

I claim:

1. A drinking vessel having a stirrer comprising: a base formed as a monolithic plastic component that has a circumferential wall and a central boss disposed within the circumferential wall, a stirrer motor disposed in said central boss, said motor having a shaft, and a switch mounted to said circumferential wall for controlling actuation of said motor; and a detachable top connectable with said base, the improvement wherein: said base has a top wall that is connected to said circumferential wall so as to cover an interior region of said base defined by said circumferential wall, said top wall having an underside against which said motor is seated wherein said shaft of said motor extends through said top wall so that said stirrer can be secured to said shaft, and said top wall is formed to have an annular groove so that a bottom circumferential edge of said detachable top can be seated in said groove for detachable connection to said base; a seal is provided in a recess formed in said underside of said top wall; and legs integral with said underside of said top wall that extend downwardly from said top wall are provided for holding said motor and drawing said motor toward said underside of said top wall and against said seal.

2. The drinking vessel of claim 1, wherein lugs integral with said base extend into said annular groove formed in said top wall of said base and complementary lugs are formed integrally with said bottom circumferential edge of said detachable top, said lugs integral with said detachable top being insertable between said lugs integral with said base that extend into said annular groove and being clamped by said lugs extending into said annular groove when rotated so as to secure said detachable top to said base.

3. The drinking vessel of claim 2, wherein said lugs extending into said annular groove or said lugs integral with said detachable top have sloping surfaces that slope in the circumferential direction such that said detachable top will be forced into said annular groove formed in said top wall of said base when rotated.

4. The drinking vessel of claim 3, wherein said annular groove formed in said top wall of said base is defined by an inner circumferential wall integral with said top wall of said base and a sealing ring is positioned in said groove to abut an adjacent sealing surface of said bottom circumferential edge of said detachable top, wherein at least one of said sealing ring or said sealing surface of said bottom circumferential edge of said detachable top is formed with a tapered surface.

5. The drinking vessel of claim 4, wherein said detachable top has an inner circumferential wall located above said sealing surface of said bottom circumferential edge that is shaped to have a constant diameter and said detachable top is shaped to be concavely curved from a top edge of said sealing surface to said inner circumferential wall of said detachable top.

6. The drinking vessel of claim 4, wherein said top wall of said base is approximately flush with a top edge of said sealing surface on said detachable top.

7. The drinking vessel of claim 4, wherein said sealing surface of said bottom circumferential edge of said detachable top is formed with said tapered surface.

8. The drinking vessel of claim 4, wherein said legs extending from said top wall of said base are positioned so that said motor compresses said seal in said recess.

9. The drinking vessel of claim 1, wherein said detachable top has a center axis that extends longitudinally therethrough and said shaft of said motor is disposed eccentrically relative to said center axis of said detachable top.

10. The drinking vessel of claim 1, wherein said stirrer is formed as a heart-shaped bail having a lower heart portion that is joined to a connecting section that slips onto said shaft of said motor to form a single unit.

11. The drinking vessel of claim 1, wherein said central boss of said base for receiving said motor consists of a wall partially enclosing said motor.

12. The drinking vessel of claim 1, wherein said switch has a key head formed as a single unit from rubber-elastic plastic disposed in an aperture in said circumferential wall of said base and said switch has an action point section, a detenting section surrounding said action point section having a circumferential groove that is seated in an annular edge section of said circumferential wall that defines said aperture, and an annular groove formed around an outer surface of said key head between said action point section and said detenting section.

13. The drinking vessel of claim 1, wherein a power source for said motor is a battery, said battery being insertable between two lugs integral with said circumferential wall.

14. The drinking vessel of claim 1, wherein an underside of said base is closed by a baseplate.

15. The drinking vessel of claim 1, wherein said legs extending from said top wall of said base are positioned so that said motor compresses said seal in said recess.

16. A drinking glass including:

a base unit, said base unit including: a housing that forms a top wall that has an undersurface in which a recess is formed; a motor disposed in said housing, said motor having a shaft that extends through said top wall of said housing, wherein said shaft is positioned to extend through said recess formed in said undersurface of said top wall; a seal disposed in said recess formed in said undersurface of said top wall so that said shaft of said motor extends through said seal; a fastening element attached to said housing for securing said motor to said top wall of said housing so as to urge said motor toward said undersurface of said top wall and against said seal; and a stirring blade attached to a portion of said shaft of said motor that extends above said top wall of said housing; and a top section having opposed open top and bottom ends wherein said top section is releasably secured at said bottom end to said base unit so as to be positioned around said stirring blade and so that liquids can be held in said top section.

17. The drinking glass of claim 16, wherein said base unit further includes at least one leg that extends downwardly from said undersurface of said top wall, wherein said at least one leg functions as said fastening element for urging said motor toward said undersurface of said top wall and against said seal.

18. The drinking glass of claim 17, wherein said base unit further includes a boss that extends downwardly from said undersurface of said top wall of said housing, said boss is formed with a center space for receiving said motor and said at least one leg extends downwardly from said boss.

19. The drinking glass of claim 17, further including a plurality of said legs extending downwardly from said undersurface of said top wall of said housing for urging said motor toward said undersurface of said top wall and said seal.

20. The drinking glass of claim 17, wherein said housing of said base unit is formed with a groove that extends at least partially circumferentially around said top wall for receiving said bottom end of said top section.

21. The drinking glass of claim 16, wherein said housing of said base unit is formed with a groove that extends at least partially circumferentially around said top wall for receiving said bottom end of said top section.

22. The drinking glass of claim 21, wherein said groove formed in said housing of said base unit extends completely circumferentially around said top wall of said housing.

23. The drinking glass of claim 21, further including a sealing ring disposed around a surface of said housing of said base unit that defines an inner perimeter of said groove so that an inner surface of said bottom end of said top section abuts against said sealing ring and at least one of said sealing ring or an inner surface of said bottom end of said top section is formed with a tapered surface.

24. The drinking glass of claim 21, wherein:

said housing of said base unit and said bottom end of said top section are provided with complementary lugs that are designed to engage each other in said groove formed in said housing of said base unit so as to secure said top section to said base unit;

a sealing ring is disposed around a surface of said housing of said base unit that defines an inner perimeter of said groove formed in said housing so that said sealing ring abuts an inner surface of said bottom end of said top section; and at least one of said sealing ring and said abutting inner surface of said bottom end of said top section is formed with a tapered surface.

25. The drinking glass of claim 16, further including a battery disposed in said base unit for supplying an energization signal to said motor.

26. The drinking glass of claim 16, wherein said stirring blade has a center mating section that is coupled to said shaft of said motor and at least two spaced apart outwardly curved members that extend away from said center mating section.

27. The drinking glass of claim 26, wherein said stirring blade further includes inwardly directed members that extend from end sections of said outwardly curved members and wherein said inwardly curved members are connected together above said center mating section.

28. The drinking glass of claim 16, wherein said motor directly contacts said seal.

29. A drinking glass including:

a base unit, said base unit including: a housing that forms a top wall that has a top surface that at least partially defines an annular groove that extends at least partially around said top wall and an undersurface in which a recess is formed; a sealing element seated in an inner perimeter of said groove; at least one base lug extending from said housing into said groove; a motor disposed in said housing, said motor having a shaft that extends through said top wall of said housing, wherein said shaft is positioned to extend through said recess formed in said undersurface of said top wall; a seal disposed in said recess formed in said undersurface of said top wall so that said shaft of said motor extends through said seal; a restraining member extending downwardly from said undersurface of said top wall for restricting lateral movement of said motor; and a fastening assembly attached to said housing for securing said motor to said top wall of said housing so as to urge said motor towards said undersurface of said top wall and against said seal; and a stirring blade attached to a portion of said shaft of said motor that extends above said top wall of said housing; and a top section having opposed open top and bottom ends wherein said bottom end is positioned to be seated in said groove formed in said base so that said top section is located around said stirring blade; and a top section lug integrally formed with said bottom end for engaging said at least one base lug so as to releasably secure said top section to said base, wherein said bottom end is positioned to abut said sealing element so that liquids can be held in said top section.

30. The drinking glass of claim 29, wherein said base unit further includes at least one leg that extends downwardly from said undersurface of said top wall, wherein said at least one leg functions as said fastening assembly for urging said motor towards said undersurface of said top wall and against said seal.

31. The drinking glass of claim 30, wherein said base unit includes two said legs and said legs further serve as said restraining members for restricting lateral movement of said motor.

32. The drinking glass of claim 31, wherein one of said bottom end of said top section or said sealing ring is formed with a tapered surface.

33. The drinking glass of claim 29, wherein: said base unit is formed so that said groove extends completely around said top wall; and said sealing element is a sealing ring that is disposed around a portion of said top wall that defines the inner perimeter of said groove.

34. The drinking glass of claim 29, wherein said motor directly contacts said seal.

* * * * *